(12) United States Patent
Leitner

(10) Patent No.: US 11,377,160 B2
(45) Date of Patent: *Jul. 5, 2022

(54) MODULAR TRUCK BED RACK SYSTEM AND PORTIONS THEREOF

(71) Applicant: Bernhard Leitner, Mission Viejo, CA (US)

(72) Inventor: Bernhard Leitner, Mission Viejo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/062,402

(22) Filed: Oct. 2, 2020

(65) Prior Publication Data

US 2021/0114669 A1   Apr. 22, 2021

Related U.S. Application Data

(63) Continuation of application No. 16/354,639, filed on Mar. 15, 2019, now Pat. No. 10,793,200, which is a continuation of application No. 15/449,646, filed on Mar. 3, 2017, now Pat. No. 10,259,508, which is a continuation of application No. 14/690,155, filed on Apr. 17, 2015, now Pat. No. 9,586,629.

(60) Provisional application No. 62/042,694, filed on Aug. 27, 2014.

(51) Int. Cl.
| | |
|---|---|
| *B62D 33/02* | (2006.01) |
| *B60R 11/06* | (2006.01) |
| *B60R 9/00* | (2006.01) |
| *B60R 9/058* | (2006.01) |
| *B60R 9/06* | (2006.01) |
| *B60R 11/00* | (2006.01) |

(52) U.S. Cl.
CPC .......... *B62D 33/0207* (2013.01); *B60R 9/00* (2013.01); *B60R 9/058* (2013.01); *B60R 9/06* (2013.01); *B60R 11/06* (2013.01); *B60R 2011/004* (2013.01); *B60R 2011/0084* (2013.01)

(58) Field of Classification Search
CPC ................ B60R 9/06; B60R 2011/004; B60R 2011/0084; B62D 33/0207
USPC .................................. 296/3; D12/406, 414.1
See application file for complete search history.

(56) References Cited

U.S. PATENT DOCUMENTS

| | | |
|---|---|---|
| 2,815,861 A | 12/1957 | Schodorf, Sr. |
| 3,594,035 A | 7/1971 | Ferguson |
| 3,765,713 A | 10/1973 | Suitt |

(Continued)

FOREIGN PATENT DOCUMENTS

| | | |
|---|---|---|
| AT | 11631 | 2/2011 |
| DE | 102009018524 | 10/2010 |

(Continued)

*Primary Examiner* — Hilary L Gutman
(74) *Attorney, Agent, or Firm* — Knobbe, Martens, Olson & Bear, LLP

(57) ABSTRACT

A rack system that is configured to allow the omission of cross bars. The cross bars can be easily removable and replaceable or can be adjustable along a length of the rack system. In some configurations, the rack system includes at least one side support arrangement comprising a first vertical support and a second vertical support. Two or more side support arrangements can be provided on each side of the truck bed. Pairs of support arrangements on one side of the truck bed can be connected by one or more longitudinal supports. Accessories, such as tool boxes or gas cans, can be connected to the one or more longitudinal supports.

19 Claims, 6 Drawing Sheets

(56) References Cited

U.S. PATENT DOCUMENTS

| | | |
|---|---|---|
| 4,057,281 A | 11/1977 | Garrett |
| 4,211,448 A | 7/1980 | Weson |
| 4,278,175 A | 7/1981 | Jackson |
| 4,304,336 A | 12/1981 | Mays |
| 4,398,763 A | 8/1983 | Louw |
| 4,405,170 A | 9/1983 | Raya |
| 4,509,787 A | 4/1985 | Knaack |
| 4,565,402 A | 1/1986 | Hopkins |
| 4,611,824 A | 9/1986 | McIntosh |
| 4,751,981 A | 6/1988 | Mitchell |
| 4,921,152 A | 5/1990 | Kemming |
| 4,989,768 A | 2/1991 | McNulty |
| 5,037,152 A | 8/1991 | Hendricks |
| 5,071,185 A | 12/1991 | Schiele |
| 5,152,570 A | 10/1992 | Hood |
| 5,190,337 A | 3/1993 | McDaniel |
| 5,294,033 A | 3/1994 | Duemmler |
| D350,934 S | 9/1994 | Talley |
| D352,697 S | 11/1994 | Johnson |
| 5,393,114 A | 2/1995 | Christensen |
| 5,494,327 A | 2/1996 | Derecktor |
| D373,988 S | 9/1996 | Johnson |
| 5,634,681 A * | 6/1997 | Gionta ............. B60P 3/14 108/44 |
| D382,534 S | 8/1997 | Green |
| D394,639 S | 5/1998 | Carter |
| 5,806,736 A | 9/1998 | Kincart |
| D410,429 S | 6/1999 | Derecktor |
| 6,033,002 A | 3/2000 | Clare |
| 6,176,540 B1 | 1/2001 | Whittaker |
| 6,186,571 B1 | 2/2001 | Burke |
| 6,347,731 B1 | 2/2002 | Burger |
| 6,439,646 B1 | 8/2002 | Cornelius |
| 6,634,689 B1 | 10/2003 | Soto |
| 6,824,192 B2 | 11/2004 | Hoffman |
| 6,845,894 B1 | 1/2005 | Vyvoda |
| 6,971,563 B2 | 12/2005 | Levi |
| 7,052,067 B2 | 5/2006 | Walker |
| 7,198,185 B2 | 4/2007 | Storer |
| 7,210,721 B1 | 5/2007 | Bell |
| D566,646 S | 4/2008 | Whittaker |
| 7,434,858 B1 | 10/2008 | Lastinger |
| D582,337 S | 12/2008 | Derecktor |
| 7,757,916 B1 | 7/2010 | Petrie et al. |
| D624,005 S | 9/2010 | Winner et al. |
| D630,015 S | 1/2011 | Weng |
| 7,914,064 B2 | 3/2011 | Joab |
| D644,839 S | 9/2011 | Pitts |
| 8,157,312 B2 | 4/2012 | Bliss, Jr |
| 8,191,744 B2 | 6/2012 | Petrie et al. |
| 8,205,717 B2 | 6/2012 | Sutton |
| 8,403,191 B2 | 3/2013 | Russo |
| 8,567,650 B2 | 10/2013 | Read |
| 8,955,880 B2 | 2/2015 | Malcolm |
| 9,150,182 B1 | 10/2015 | Schlangen et al. |
| 9,193,290 B2 | 11/2015 | Lazarevich |
| 9,580,004 B2 | 2/2017 | Puchkoff |
| 9,586,629 B2 | 3/2017 | Leitner |
| 2002/0163214 A1 | 11/2002 | Carter |
| 2003/0201656 A1 | 10/2003 | Ferguson |
| 2004/0201240 A1 | 10/2004 | Corbett |
| 2005/0061841 A1 | 3/2005 | Farentinos |
| 2005/0145527 A1 | 7/2005 | Christensen |
| 2007/0241580 A1 | 10/2007 | Ward |
| 2008/0079277 A1 | 4/2008 | Wethington |
| 2008/0100075 A1 | 5/2008 | Derecktor |
| 2008/0143133 A1 | 6/2008 | Nichols |
| 2009/0255966 A1 | 10/2009 | Prapavat |
| 2012/0267404 A1 | 10/2012 | Rottinghaus et al. |
| 2015/0203050 A1 | 7/2015 | Finestone |
| 2015/0367902 A1 | 12/2015 | Schanz et al. |
| 2016/0214542 A1 | 7/2016 | Rohr et al. |
| 2017/0174270 A1 | 6/2017 | Leitner |
| 2018/0072254 A1 | 3/2018 | Wymore |
| 2018/0134204 A1 | 5/2018 | Aplin |

FOREIGN PATENT DOCUMENTS

| | | |
|---|---|---|
| EP | 3078548 | 10/2016 |
| FR | 2720351 | 12/1995 |

\* cited by examiner

MODULAR TRUCK BED RACK SYSTEM AND PORTIONS THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference herein and made a part of the present disclosure.

BACKGROUND

Field

The present disclosure relates to rack systems for truck beds and other vehicles. In particular, the present disclosure relates to a modular truck bed rack system, sub-assemblies and components of the system.

Description of the Related Art

Existing truck bed racks typically utilize several vertical or substantially vertical supports on each side of the truck bed. Laterally-extending beams ("cross bars") extend between upper ends of at least some of the opposing pairs of vertical supports. In some cases, longitudinally-extending beams extend along the upper ends of the vertical supports. The lateral and longitudinal beams are typically placed slightly above a height of the roof of the truck cab so that items can be supported above the roof line. The vertical location of the cross bars is too low to accommodate taller items, such as motorcycles, in the truck bed. However, because the cross bars are structural elements of the rack, they cannot be removed without removal of the entire rack. Most truck bed racks are intended to be permanent and are not easily removed. Thus, the presence of a typical truck bed rack can render the vehicle incapable of certain uses.

SUMMARY

The systems, methods and devices described herein have innovative aspects, no single one of which is indispensable or solely responsible for their desirable attributes. Without limiting the scope of the claims, some of the advantageous features will now be summarized.

In at least some configurations, the rack systems disclosed herein omit cross bars, permit cross bars to be easily removable and replaceable, or can permit cross bars to be adjustable along a length of the rack system. In some configurations, the rack systems include at least one support arrangement comprising a first vertical support and a second vertical support.

In some configurations, two or more support arrangements are provided on each side of the truck bed. Pairs of support arrangements on one side of the truck bed can be connected by one or more longitudinal supports, such as beams, bars or rails.

In some configurations, accessories, such as tool boxes or gas cans, can be connected to the longitudinal supports.

In some configurations, the support arrangements on opposite sides of the truck bed can be aligned with one another.

In some configurations, although the provision of first and second vertical supports in each support arrangement provides sufficient structural support to the truck bed rack system to permit cross bars to be omitted, in at least some configurations, removable cross bars can extend between opposing support arrangements.

In some configurations, although described in connection with a truck bed rack system, aspects of the system can be used in other vehicles or modified for use in other vehicles, such as cargo vans, for example.

In at least some configurations, a rack system for use in a truck bed includes a pair of first side supports located, in use, on opposing sides of the truck bed. Each of the first side supports comprises a first post and a second post. The first post is supported by the truck bed at a first location and the second post is supported by the truck bed at a second location spaced from the first location such that each of the first side supports is self-supporting. Each one of a pair of second side supports is located, in use, on opposing sides of the truck bed at spaced locations from the pair of first side supports along a length of the truck bed. Each one of at least one pair of rails are positioned on opposing sides of the truck bed and extending between the first side support and the second side support on each side of the truck bed. A first cross bar extends between the at least one pair of rails on each side of the truck bed. The first cross bar is removable from or adjustable along a length of the at least one pair of rails. A second cross bar extends between the at least one pair of rails on each side of the truck bed.

In some configurations, the second cross bar has a fixed position relative to the rack system.

In some configurations, the second cross bar is located at or adjacent the pair of second side supports.

In some configurations, the second cross bar is connected directly to the at least one pair of rails.

In some configurations, the first position is on a rail of a side wall of the truck bed and wherein the second position is on the side wall of the truck bed below the rail. In some such configurations, the second post is pivotal such that an angle of the second post relative to the first post can be adjusted.

In some configurations, the first position is on a rail of a side wall of the truck bed and wherein the second position is on a floor of the truck bed.

In some configurations, the system further comprises a tool box, gas can or other accessory mounted to one of the at least one pair of rails. In some configurations, the at least one pair of rails comprises an upper pair of rails and a lower pair of rails. In some configurations, the toolbox comprises an upper bracket and a lower bracket that connect to a respective one of the upper rail and the lower rail, wherein each of the upper bracket and the lower bracket comprise a portion that extends along and is coupled to a respective one of an upper and lower wall of the toolbox. The toolbox can comprise a vertical inner wall and an angled outer wall when assembled to the rack system.

In some configurations, at least one load stop is adjustably mounted on one or both of the first cross bar and the second cross bar. In some configurations, an upper surface of each of the first cross bar and the second cross bar comprises a pad, and wherein a gap is provided between the at least one load stop and the pad.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
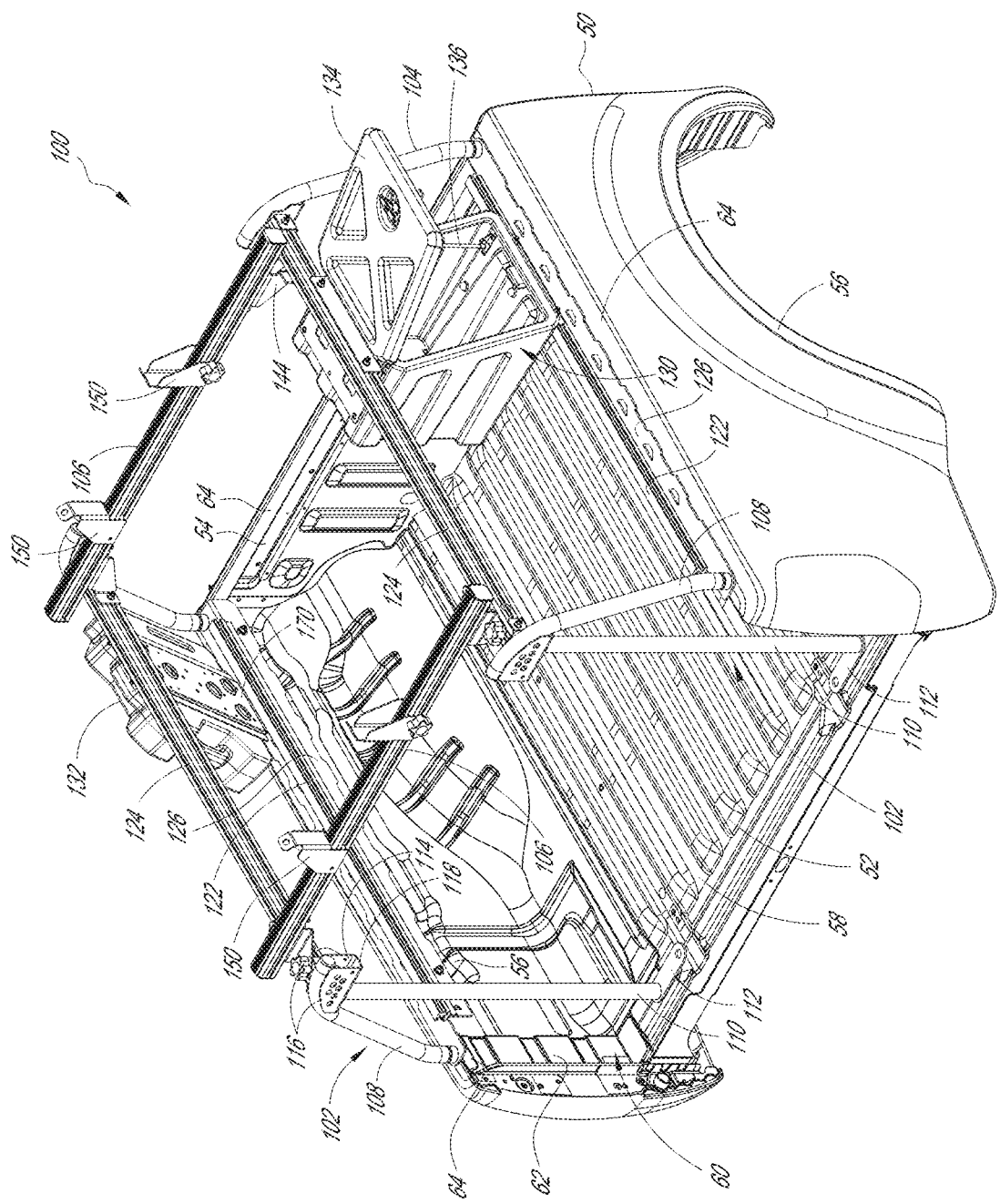
FIG. 1 is a perspective view of a truck bed rack system having certain features, aspects and advantages of the present disclosure.

Embodiments of systems, components and methods of assembly and manufacture will now be described with reference to the accompanying figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

In at least some configurations, a rack system 100 comprises side support arrangements on each side of the truck bed. The side support arrangements can be interconnected by cross members, such as cross bars. However, at least a portion of the side support arrangements preferably are self-supporting such that the rack system 100 can be loaded in the absence of a cross member in at least a rearward portion (e.g., rearward one-half or rearward two-thirds) of the rack system 100. In some configurations, each side support arrangement comprises at least one side support structure 102 on a first side of the truck bed and at least one side support structure 102 on a second side of the truck bed. The first and second sides can be opposite lateral sides, for example. Preferably, each of the first and second sides includes at least one side support structure 102 that is self-supporting. That is, the side support structures 102 can support a load without a cross bar or other structure connecting one side support structure to the side support structure on the opposite side of the truck bed. Advantageously, such an arrangement allows for objects taller than the side supports to be positioned or passed between the side supports. For example, a cross bar, if present, can be moved or removed from between the side supports 102 to accommodate tall loads.

In the illustrated configuration, the rack system 100 is installed in an open pick-up truck bed 50. The truck bed 50 can have a floor 52, a front wall 54 and a pair of side walls 56 laterally separated by the front wall 54. The floor 52, the front wall 54 and the side walls 56 at least partially define a cargo space 58, which can extend above the upper extent of the walls 54, 56. The rearward end of the truck bed 50 can define an opening 60, which can be utilized for loading cargo into the cargo space 58. The opening 60 can be selectively closed by a suitable closure, such as a pivoting tail gate (not shown). Rearward ends of the side walls 56 can include pillars 62, which can extend inwardly toward one another a relatively short distance from the remainder of the side walls 56. Upper ends of any or all of the front wall 54 and side walls 56 can include a laterally-extending upper edge or rail 64. Such an arrangement is typical of a pick-up truck bed and is utilized to provide an environment for the description of the rack system 100 herein. However, the rack system 100 can be utilized or configured for use with other environments or applications, including different types of truck beds or different (e.g., enclosed) cargo spaces.

In the illustrated arrangement, each side support arrangement of the rack system 100 includes two types of vertical support structures. A first type of vertical support structure 102 (referred to as a "side support" herein) is located at one end of the truck bed 50 or cargo space 58. In at least some configurations, the first side support 102 is located away from the front wall 54 or front end of the cargo space 58. As described above, preferably, the first side support 102 is self-supporting or can accommodate a load in the absence of support by a cross bar or other structure that connects one of the first side supports 102 on one side of the truck bed 50 to another one of the first side supports 102 on the opposite side of the truck bed 50. In the illustrated arrangement, the first side supports 102 are located one each side at or near the rearward end of the truck bed 50 or cargo space 58. In some configurations, the first side supports 102 can be located along an intermediate portion of the truck bed 50 or cargo space 58 in addition to or in the alternative of the first side supports 102 located at or near the rearward end of the truck bed or cargo space 58.

A second type of vertical support structure 104 (also referred to as a "side support" herein) is not necessarily self-supporting. The second side support 104 can rely on a cross bar 106 or other lateral support structure for structural stability and load-carrying capacity. In some configurations, the second side supports 104 are located on each side at or near the front wall 54 or the forward end of the truck bed 50 or cargo space 58. The cross bar 106 extends between and directly or indirectly connects the second side support 104 on one side of the truck bed 50 to the second side support 104 on the other side of the truck bed 50. In some configurations, the first side supports 102, or self-supporting supports, can be utilized in place of the second supports 104 at or near the front wall 54 or the forward end of the truck bed 50 or cargo space 58. However, because, at least in a pick-up truck environment, a cab of the truck is located adjacent the front wall 54 of the truck bed 50, the presence of the cross bar 106 typically does not negatively impact the ability to accommodate cargo, at least to any significant extent.

In the illustrated arrangement, each of the first side supports 102 comprises a first vertical support portion 108, such as a post or column, and a second vertical support portion 110, such as a post or column (each referred to as a "support post" herein). The first support post 108 can be anchored to or supported by the truck bed 50 at a first location. For example, the first support post 108 can be positioned on or near the side wall 56 or rail 64 of the truck bed 50. The second support post 110 can be positioned inwardly, or toward a center of the truck bed 50, relative to the first support post 108. Preferably, an upper end of the first support post 108 is directly or indirectly attached to an upper end of the second support post 110. The second support post 110 can be anchored to or otherwise supported by the truck bed 50 at a second location that is spaced from or different than the first location. In the illustrated arrangement, the first support post 108 and the second support post 110 are distinct members; however, in other arrangements, the first support post 108 and the second support post 110 could be integrated into a single structure, such as a plate or box-like structure. Preferably, however, such an arrangement includes two spaced mounting locations.

In one configuration, as illustrated in FIG. 1, the second support post 110 is supported by the floor 52 of the truck bed 50. The second support post 110 can be longer than the first support post 108 and can have a lower end that extends all the way to the floor 52 of the truck bed 50. The lower end of the second support post 110 can include a base or foot 112 that rests on the floor 52 of the truck bed 50. In some configurations, the foot 112 can be coupled to the floor 52 by any suitable arrangement, such as one or more fasteners or a welded connection, for example. In some configurations, the foot 112 can be secured at a location and/or by a fastener that connects the truck bed 50 to the truck frame or other underlying structure. In the illustrated arrangement, the second support post 110 is a substantially vertical member. The second support post 110 is spaced laterally inward from the associated first support post 108 toward a center of the truck bed 50. However, preferably, the second support post 110 is spaced laterally outward from the center of the truck bed 50 and, more preferably, substantially laterally outward from the center of the truck bed 50 to reduce interference with cargo passing through the opening 60 or within the cargo space 58 of the truck bed 50. In some configurations, the second support post 110 is located substantially in line with or laterally outward of an inner edge of a wheel well of the truck bed 50 and/or within about 6-12 inches from the side wall 56. Such an arrangement can reduce or minimize the impact of the rack system 100 with the cargo capacity or ease of loading of the truck bed 50.

As described herein, upper end portions of the first support post 108 and the second support post 110 can be directly or indirectly connected to one another. In the illustrated arrangement, a bracket 114 couples the first support post 108 and the second support post 110 or reinforces a connection therebetween. The first support post 108 and the second support post 110 can be fixedly connected to the bracket 114 such that no relative rotation or adjustment is permitted between the bracket 114 and the posts 108, 110. The bracket 114 can be of any suitable arrangement, such as including one or more plate portions 116. The illustrated bracket 114 includes a pair of plate portions 116 spaced from one another in a longitudinal direction of the truck bed 50. For example, a plate portion 116 can be provided on each of the forward and rearward sides of the first support post 108 and/or the second support post 110. A longitudinal wall 118 can extend from the plate portion 116 or between the plate portions 116 when two plate portions 116 are provided. The longitudinal wall 118 can include an opening that permits the second support post 110 to pass therethrough or can include a receptacle to receive the second support post 110.

The bracket 114 can be coupled to one or both of the first support post 108 and the second support post 110 by any suitable arrangement. For example, the bracket 114 can be permanently affixed to the first support post 108, such as by welding, and removably connected to the second support post 110, such as by one or more fasteners, or vice-versa. In other arrangements, the bracket 114 is removably affixed to each post 108, 110 and, in yet other arrangements, the bracket 114 is permanently affixed to each post 108, 110.

Figure 2:
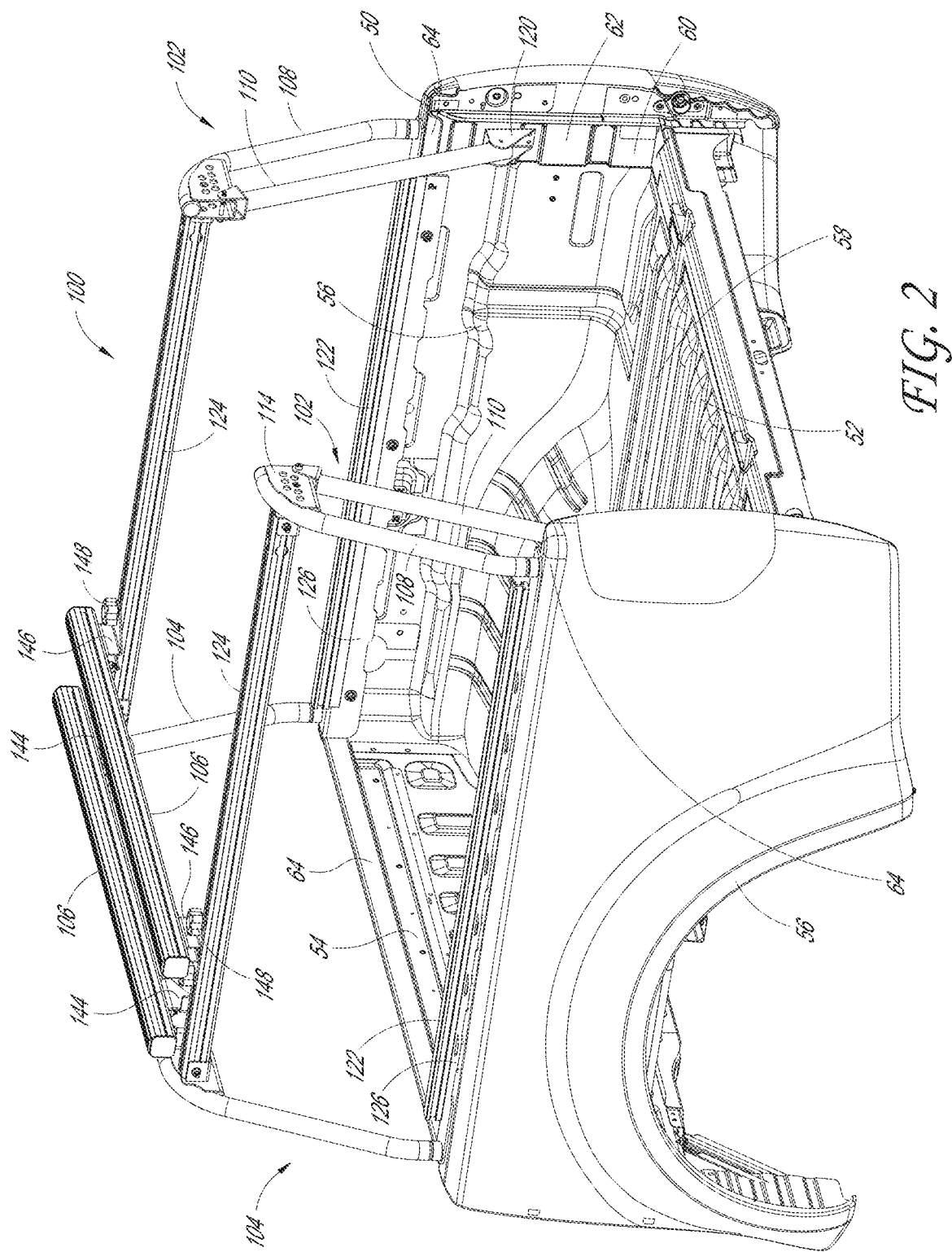
FIG. 2 is a perspective view of another truck bed rack system having certain features, aspects and advantages of the present disclosure. A movable cross bar is moved to a forward position.
Figure 3:
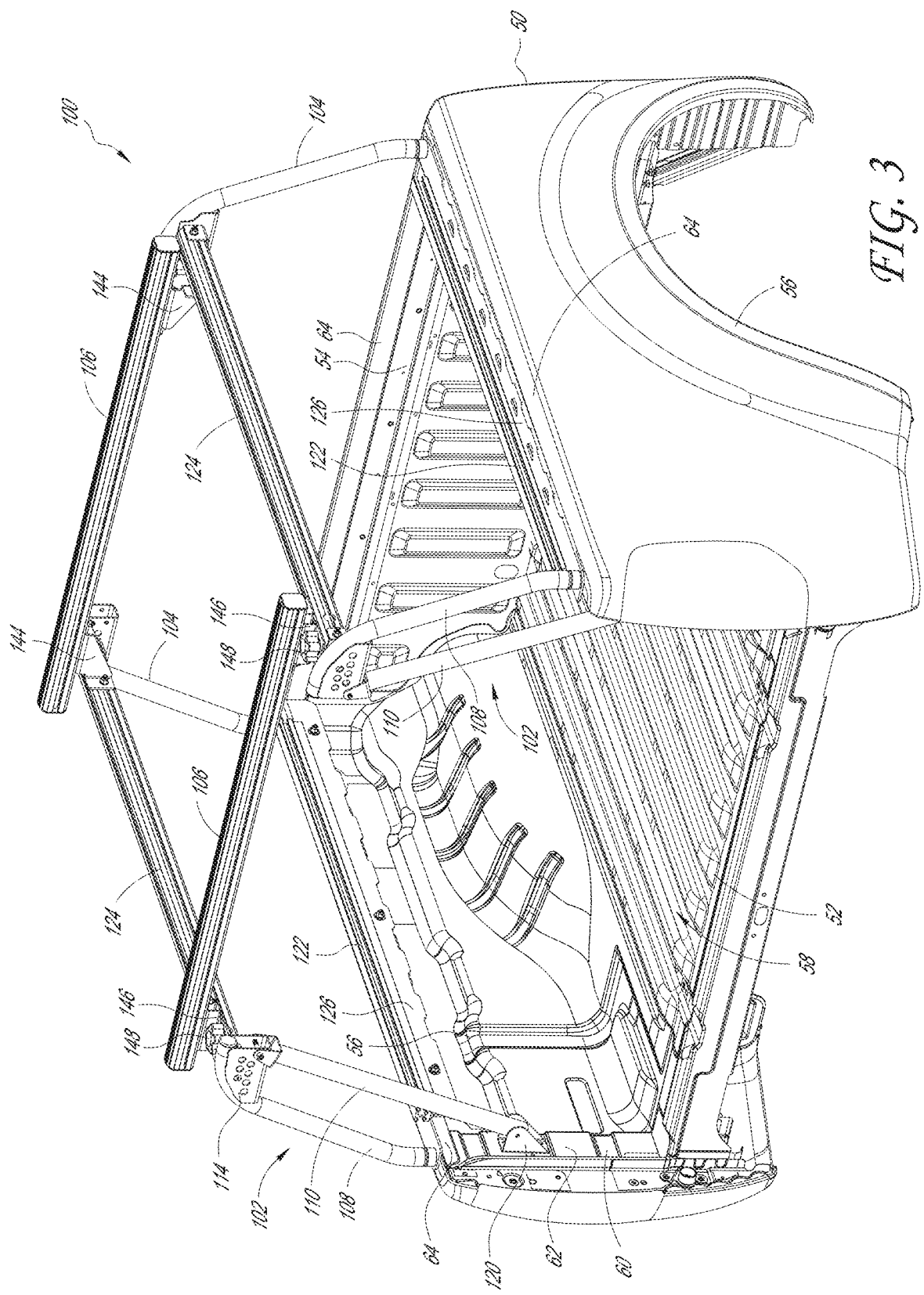
FIG. 3 is another perspective view of the rack system of FIG. 2 with the movable cross bar in a rearward position.
Figure 4:
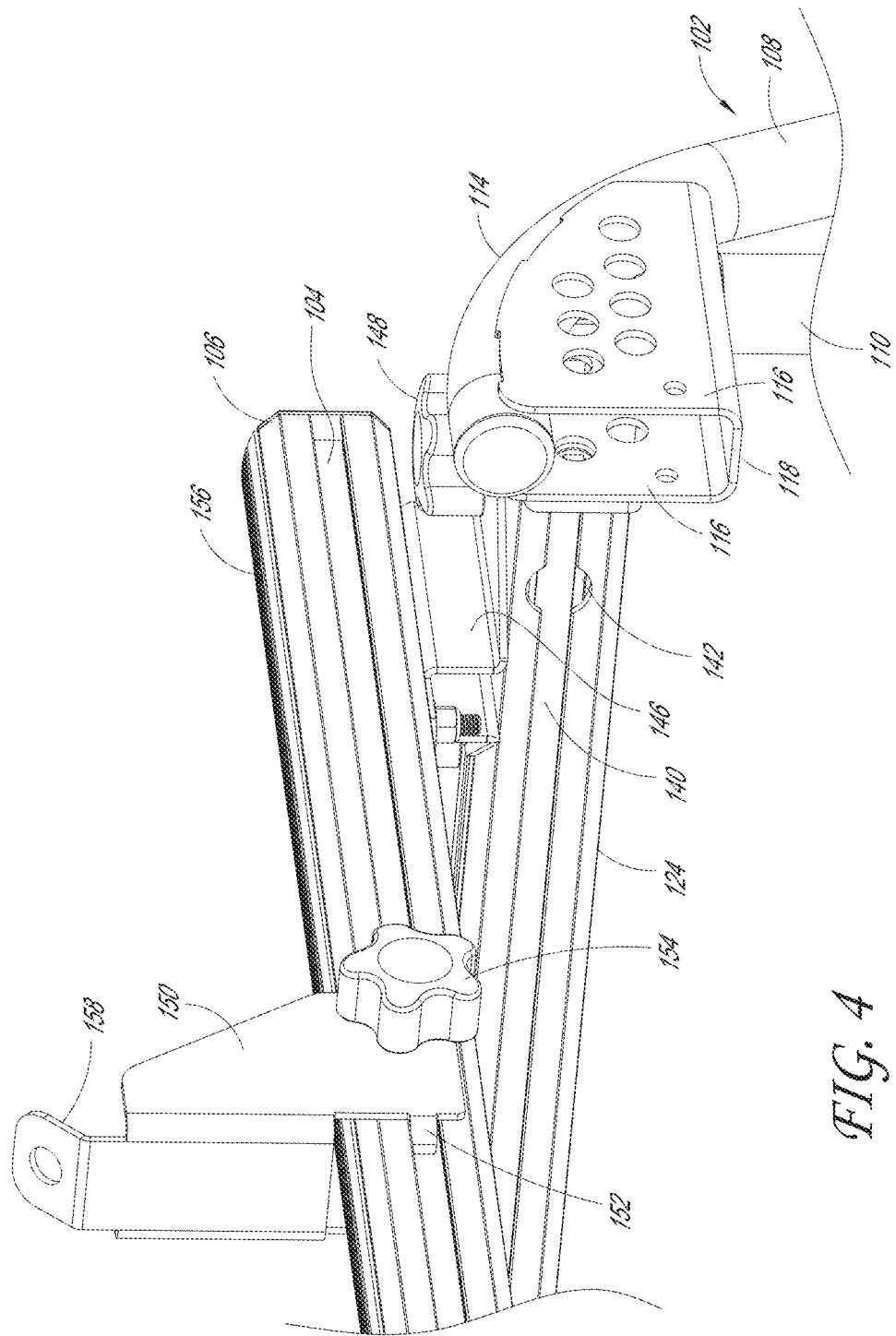
FIG. 4 is a perspective view of a portion of the rack system of FIG. 2 illustrating an upper support rail, a cross bar and a load stop secured to the cross bar.
Figure 5:
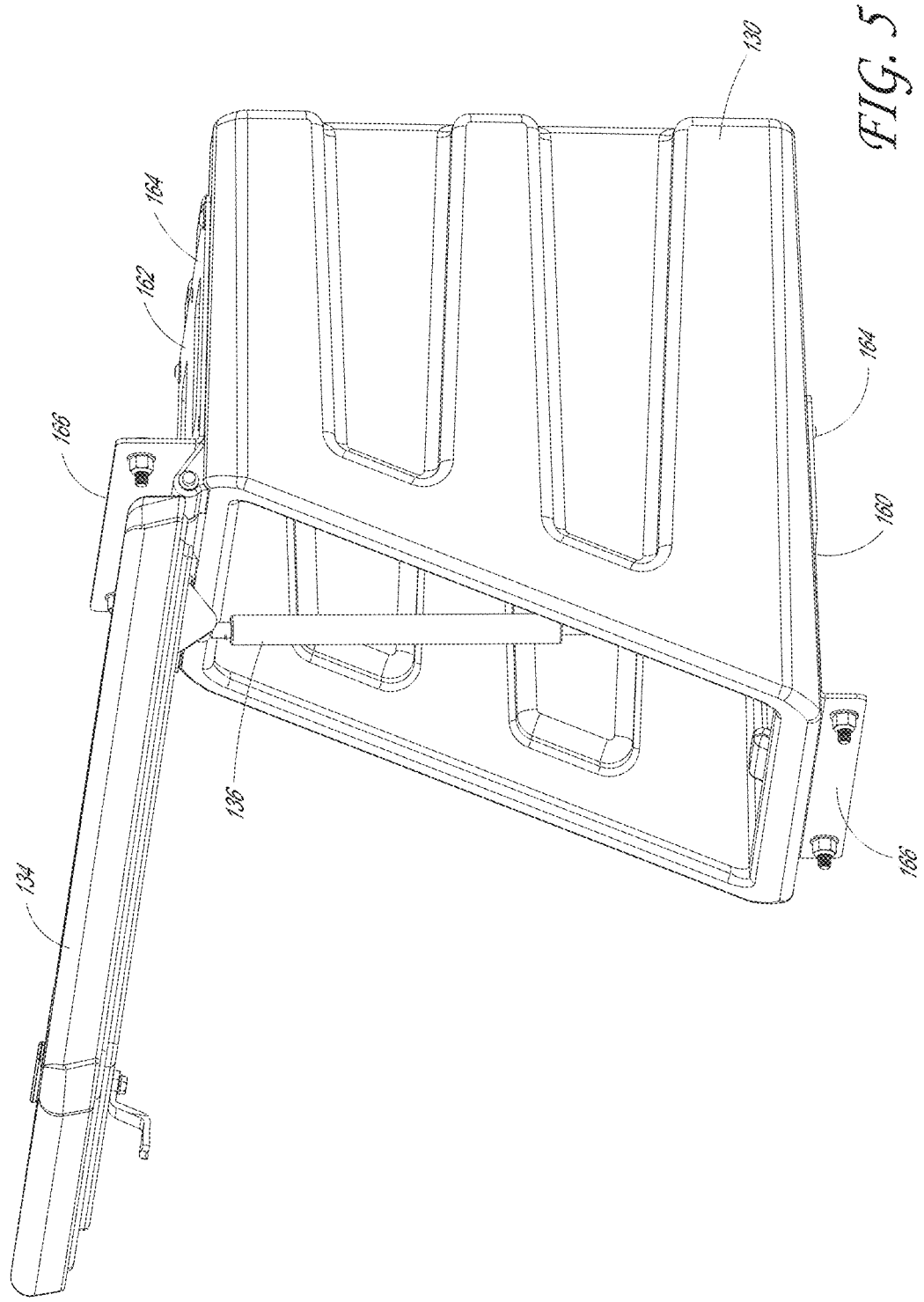
FIG. 5 is a side perspective view of an accessory toolbox that is mountable to the rack system.
Figure 6:
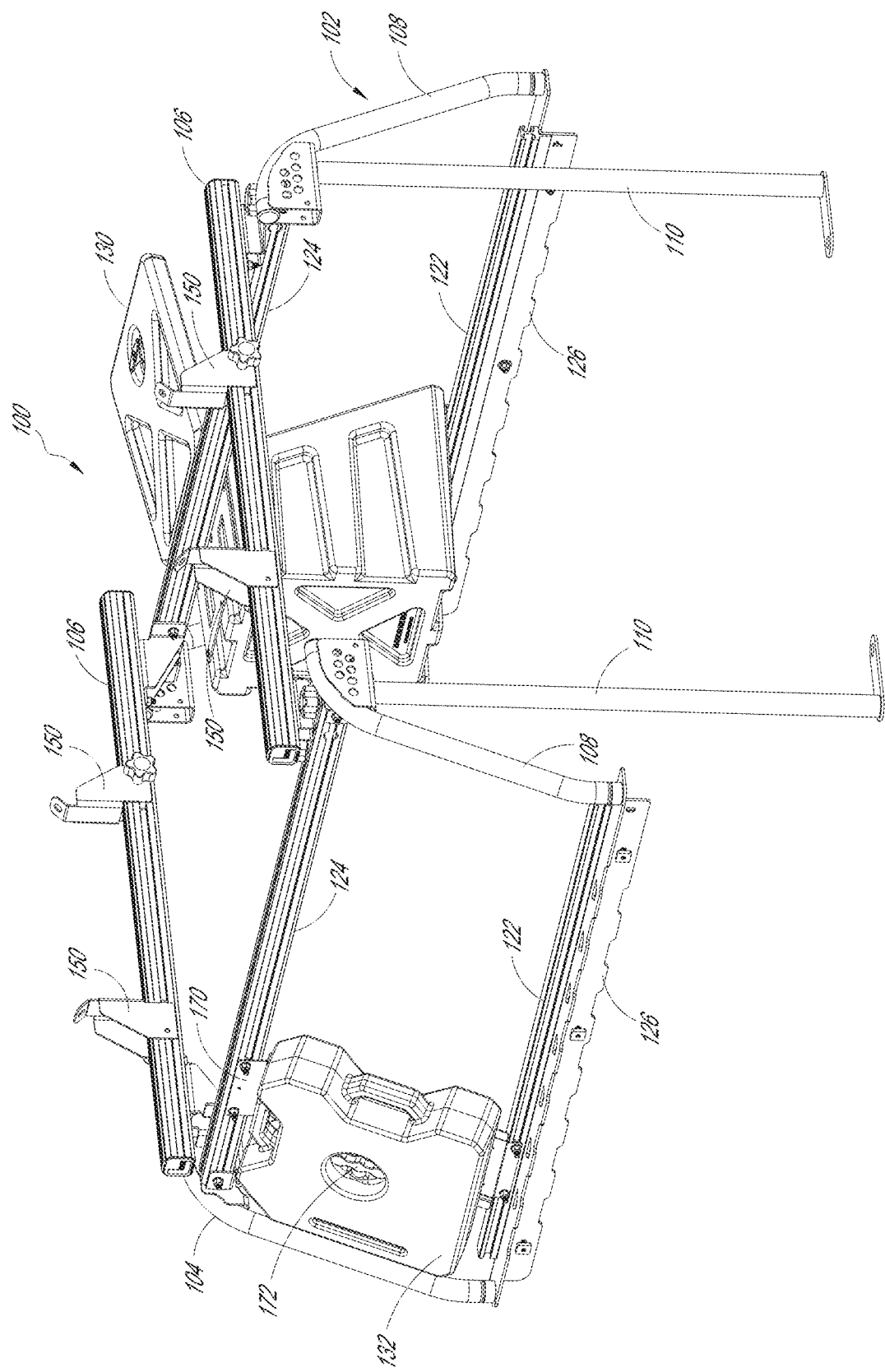
FIG. 6 is perspective view of an accessory gas can mounted to the rack system.

In another configuration, as illustrated in FIGS. 2 and 3, the second support post 110 is supported by a portion of the truck bed 50 other than the floor 52. Preferably, the second support post 110 is supported at a location above the floor 52 of the truck bed 50. For example, in the illustrated arrangement, the second support post 110 is supported at its lower end by the side wall 56 of the truck bed 50. In particular, the second support post 110 is supported by the pillar 62 or other structure of the side wall 56 that is adjacent to or defines the opening 60 to the cargo space 58. In some configurations, the second support post 110 is supported by the truck bed 50 at a location that is within the upper half of the side wall 56 relative to the floor 52.

The second support post 110 can be affixed to the truck bed 50 by any suitable arrangement, which can create a permanent or removable connection. In the illustrated arrangement, a mounting bracket 120 is coupled to the truck bed 50 and the second support post 110 is coupled to the mounting bracket 120. The mounting bracket 120 can be coupled to the truck bed 50 by any suitable arrangement, such as in pre-existing mounting locations or by a mounting location specific to the rack system 100. One or more fasteners can be used to mount the mounting bracket 120 to the truck bed 50. Similarly, one or more fasteners can be used to mount the second support post 110 to the mounting bracket 120.

The upper end of the second support post 110 can be pivotally supported by the bracket 114, the first support post 108 or another support structure. Such an arrangement allows an angle of the second support post 110 to be adjusted to position the lower end of the second support post 110 at the appropriate mounting location, such as at the mounting bracket 120. This feature can permit the first side support 102 to be used with a variety of different truck models, sizes of truck bed 50 or mounting locations with little or no modifications. For example, in some configurations, a length of the supplied second support post 110 can be varied to suit different applications, with a majority or all of the other components of the first side support 102 being the same between different applications.

The first support post 108 can be angled, curved, tilted or otherwise extend inwardly toward the second support post 110, which can be oriented in a substantially vertical direction or can also be angled, curved, tilted or otherwise inwardly projected. The tilted orientation of the first support post 108 can position accessories of the rack system 100 in a desirable orientation. However, it should be noted that either of the first support post 108 or the second support post 110 can be vertical, substantially vertical, angled, tilted or curved. In many configurations, one or both of the first and second support posts 108, 110 have a significant vertical component to provide height to the rack system 100. In some configurations, the upper ends of the first and/or second support posts 108, 110 are at or near (including below or above) the top surface of the truck cab.

As described above, in some configurations, the rack system 100 comprises two or more side support structures 102, 104 on one or both sides of the truck bed 50. For example, one side support structure 102, 104 can be positioned at the front of the truck bed 50 and a second side support structure 102 or 104 can be positioned at the rear of the truck bed 50. In some configurations, one or more intermediate side support structures 102 or 104 can be provided in between the front and rear side support structures 102 or 104. In some configurations, each side of the truck bed 50 has the same number and substantially the same positioning or spacing of the side support structures 102 or 104.

The side support structures 102, 104 on one side of the truck bed 50 can be coupled to one another by, or can have extending therebetween, one or more longitudinal support members, such as longitudinal bars, channels or rails. In the illustrated arrangement, a lower longitudinal rail ("lower rail") 122 and an upper longitudinal rail ("upper rail") 124 are provided on each side of the truck bed 50. The lower rail 122 can be located at or near a lower end of the first support post 108 and/or at or near the rail 64 of the side wall 56. The upper rail 124 can be located at or near an upper end of the first support post 108 and/or the second support post 110. The lower rail 122 and/or the upper rail 124 can extend parallel relative to one another such that components of the rack system 100 can be positioned as desired along the lower rail 122 and upper rail 124, as described further below. In some configurations, the lower rail 122 and the upper rail 124 are offset from one another in a lateral direction. For example, in the illustrated arrangement, the upper rail 124 is offset to the inside of the lower rail 122.

In the illustrated configuration, the lower rail 122 is coupled to a longitudinal support member 126 in the form of an L-channel having an upper flange that rests on the rail 64 of the side wall 56 and a side flange that extends downwardly from the upper flange within the cargo space 58 of the truck bed 50. In the illustrated arrangement, the longitudinal support member 126 extends between and couples the forward side support 104 and the rearward side support 102. The longitudinal support member 126 can include a boss or other receptacle for receiving the side supports 102, 104. The longitudinal support member 126 can be coupled to the truck bed 50 by any suitable arrangement. In some configurations, the longitudinal support member 126 can be coupled to pre-existing fastening locations. In other configurations, the longitudinal support member 126 can be coupled to fastening locations specifically created for the rack system 100 or can be clamped to the rail 64 by one or more clamp members. The lower rail 122 can be coupled to the longitudinal support member 126 by any suitable arrangement, which can be either permanent or removable. For example, the lower rail 122 can be welded to the longitudinal support member 126 or the lower rail 122 can be secured to the longitudinal support member 126 by one or more fasteners.

The lower and/or upper rails 122, 124 can support accessories of the truck bed rack system 100, such as modular tool boxes 130 or gas cans 132, for example. The tool boxes 130 can be easily assembled to, locked to and removed from the rack system 100. In some configurations, the tool boxes 130 have locking lids 134 that can be lifted open and held by a suitable arrangement, such as one or more gas struts 136, for example. In some configurations, the tool boxes 130 can have wheels (and, possibly, a handle) to allow rolling of the tool box 130. Other accessories can also be used with the rack system 100, such as water containers, jacks, work lights, etc.

The accessories can be coupled to the lower and upper rails 122, 124 by any suitable arrangement. In some configurations, the accessories are coupled to specific mounting locations along the lower and upper rails 122, 124. In other configurations, the accessories can be coupled anywhere along the lower and upper rails 122, 124. In other words, the accessories can be infinitely adjustable along the lower and upper rails 122, 124. In some configurations, one or both of the lower and upper rails 122, 124 include one or more slots 140 that can receive a portion of a fastener, one or more of which can be used to couple the accessory to the lower and upper rails 122, 124. Any suitable arrangement of slot 140 can be used, such as a T-shaped slot that receives the fastener head and allows a threaded end of the fastener to extend out of the slot 140 and be exposed from the lower and upper rails 122, 124. The slot 140 can extend along any portion(s) or a substantial entirety of the lower and upper rails 122, 124. The slot 140 can include one or more access openings 142 that permit entry of the fastener head, or an end of the slot 140 can be made accessible such that the fastener head can be introduced into the slot 140 via the end. In some configurations, access openings 142 can be provided at regular intervals along the slot 140.

As described above, the rack system 100 can include one or more cross beams or cross bars 106 that extend in a lateral direction of the truck bed 50 or rack system 100. With the cross bars 106 installed, the truck rack system 100 can provide the same or similar utility as conventional truck bed racks. For example, the truck bed rack system 100 with cross bars 106 installed can permit objects to be carried above the roof line of the truck cab. In some configurations, the cross bars 106 are removably coupled to the side supports 102, 104 or upper rails 124. For example, the cross bars 106 can be mounted with a quick-release mounting arrangement to be relatively quick and easy to remove and install.

In the illustrated arrangement, one of the cross bars 106 is fixedly and/or non-removably mounted to the side supports 102, 104 or upper rails 124. As used herein, non-removably includes permanent mounting (e.g., welded joints) and mounting that is not intended for regular removal. For example, a non-removable connection can include multiple fasteners that could permit removal, but such removal would be time-consuming or inconvenient to perform on a regular basis. In the illustrated arrangement, the forward cross bar 106 is fixedly mounted to forward end portions of the upper rails 124. However, in other arrangements, the cross bar 106 could be mounted to or could be integral with the second side supports 104 on each side of the truck bed 50. In the illustrated arrangement, the forward cross bar 106 is coupled to each of the upper rails 124 via a bracket 144. The brackets 144 are configured to support the cross bar 106 at a spaced location above the upper rails 124.

The illustrated rearward cross bar 106 is coupled to each of the upper rails 124 via a bracket 146. The brackets 146 are configured to support the rearward cross bar 106 at a spaced location above the upper rails 124. Preferably, the rearward cross bar 106 is located at substantially the same height relative to the floor 52 of the truck bed 50 as the forward cross bar 106. In some configurations, the brackets 146 are configured to be adjustable along the upper rails 124 such that a position of the rearward cross bar 106 can be adjusted along the length of the rack system 100. In some configurations, the brackets 146 can slide along the upper rails 124 such that the rearward cross bar 106 is infinitely adjustable along the length of the rack system 100. Each of the upper rails 124 can include a slot 140 that receives fasteners 148 that secure the bracket 146 at a desired location within the slot 140 and, thus, at a desired location along the upper rail 124. In some configurations, the slot 140 is located on an upper surface of the upper rails 124.

The fasteners 148 can have a head portion received within the slot 140 and a threaded shaft portion can extend upwardly and receive a nut that secures the bracket 146 against the upper rail 124. In the illustrated arrangement, the nut comprises a relatively large handgrip portion that permits a user to tighten and loosen the nut by hand. Accordingly, with such an arrangement, a location of the rearward cross bar 106 along the upper rails 124 can be adjusted by hand and, preferably, without the use of tools. Other suitable arrangements for adjustably securing the brackets 146 or rearward cross bar 106 relative to the upper rails 124 can also be used, such as lever actuated cam locks, for example.

Preferably, the rearward cross bar 106 is secured at a desirable location on the upper rails 124 by a tool-less, quick-release locking arrangement such that the position of the cross bar 106 can be conveniently adjusted by hand and without the use of tools. If tools are required, it is preferred that the locking arrangement be relatively quick to move between a locked and an unlocked position, such as an arrangement requiring only one-quarter to one-half turn of a locking member. In some configurations, a key or other tool could be required to move the locking arrangement between the locked and the unlocked position to provide additional security and avoid unintentional or undesirable adjustment or removal of the rearward cross bar 106. Although one adjustable cross bar 106 is shown, the rack system 100 could accommodate additional adjustable cross bars 106. Thus, any desired or suitable number of fixed and/or adjustable cross bars 106 can be provided.

The illustrated arrangement allow the rearward cross bar 106 to move between a rearward position (e.g., aligned with or adjacent to the first side support 102) and a forward position (e.g., adjacent the second side support 104 and/or forward cross bar 106). Advantageously, with such an arrangement the rack system 100 can provide spaced-apart cross bars 106 suitable for accommodating objects (e.g., ladders, lumber, pipes, etc.) sitting atop the cross bars 106, which may be elongate and, in some cases, extend forward of the truck bed 50 and above the cab of the truck. The rearward cross bar 106 or cross bars can be selectively moved forward to allow taller objects (e.g., motorcycles, all-terrain vehicles, furniture, appliances, etc.), which may extend above the upper rails 124, to be accommodated in the cargo space 58 without removal of the rack system 100 from the truck bed 50. In alternative arrangements, the rearward cross bar 106 or cross bars can be removed instead of moved to the front of the rack system 100. As described above, the first side supports 102 are configured to accommodate a load placed on the rack system 100 when the rearward cross bar(s) 106 are moved forwardly away from the first side support 102 or removed entirely. In other words, the first side supports 102 can accommodate a load placed on the rack system 100 in the absence of a cross bar or other lateral support member extending between and in the vicinity of the first side supports 102. Thus, it is not necessary to remove any accessories supported on the sides of the rack system 100 (as described further below) when the rearward cross bar(s) 106 are moved to the forward position or removed.

The rack system 100 maintains its utility even when the rearward cross bar(s) 106 are moved forwardly or removed such that the rack system 100 can accommodate tall objects.

The cross bars 106 can be configured to support load stops 150 that provide a stop surface against which the carried objects can be abutted. A single cross bar 106 can include two load stops 150 facing one another such that objects can be positioned between the load stops 150. In some configurations, the load stops 150 are adjustable along a length of the cross bar 106. In the illustrated arrangement, the cross bars 106 include one or more slots 140, which can be the same as or similar to the slots 140 of the lower and upper rails 122, 124. Alternatively, the slots 140 can be U-shaped slots instead of T-slots. Slots 140 of other suitable shapes can also be used. Preferably, the cross bars 106 include slots 140 on each of a forward and rearward side. The load stops 150 can include projections 152 that extend into the slots 140 to support the load stops 150 in a vertical direction relative to the cross bar 106. A fastener 154 can extend through one or both sides of the load stop 150 and can be tightened against the cross bar 106 to secure the load stop 150 at a desired location along the length of the cross bar 106. The fastener 154 can include a hand grip portion that allows a user to tighten or loosen the fastener 154 by hand. Other suitable types of fasteners or other arrangements for securing the load stop 150 in place can be used, such as those described with respect to the brackets 146 for the movable cross bar 106, for example.

In some configurations, an upper surface of the cross bars 106 can include a rubber pad 156 to protect the objects placed on the cross bars 106 and/or to protect the cross bar 106 from the objects placed thereon. The rubber pad 156 can be coupled to the cross bar 106 by any suitable arrangement, such as mechanically or adhesively coupled, for example. In the illustrated arrangement, the upper surface of the cross bars 106 include a slot (e.g., the same as or similar to the slots 140) that receives the rubber pad 156. The rubber pad 156 can be configured such that an uppermost surface of the pad 156 extends above an uppermost surface of the cross bar 106. Although described as a rubber pad 156, the pad 156 can be made from any suitable material, such as rubber-like materials, elastomeric materials or plastic materials, for example and without limitation.

In the illustrated arrangement, the load stop 150 is configured to define a gap above the cross bar 106 and, in particular, above the rubber pad 156 such that the load stop 150 does not contact the rubber pad 156. Accordingly, the load stops 150 can be moved as desired without impacting or contacting the rubber pad 156. Thus, preferably, the locking arrangements (e.g., fastener 154) for the load stop 150 engages the sides or underneath of the cross bar 106 and does not engage the top of the cross bar 106 or at least does not engage the top of the cross bar 106 at a location of the rubber pad 156. For example, in alternative arrangements, the locking arrangements of the load stop 150 could engage the top surface of the cross bar 106 at a location or locations adjacent the rubber pad 156, such as at peripheral locations straddling the rubber pad 156.

The load stop 150 can comprise a bent sheet material (e.g., sheet metal) having side portions on each side of a central portion. A tab 158 can include an opening configured to receive a rope or tie down such that a load positioned on the rack system 100 can be secured. The tab 158 can extend from the central portion of the load stop 150 and can extend at an angle from the central portion. In the illustrated arrangement, the tab 158 extends laterally outward so as to avoid interfering with a load carried between the load stops 150.

As described above, the rack system 100 can be configured to carry one or more accessories. In some configurations, each of the accessories is carried in part or in its entirety by the lower rail 122 and/or the upper rail 124. Accessories can include, for example, the above-described modular tool boxes 130 or gas cans 132. The tool boxes 130, gas cans 132 and other accessories can be easily assembled to, locked to and removed from the rack system 100. For example, any suitable type of tamper-resistant fastener can be used to secure the accessories to the rack system 100.

Moreover, as described above, the rack system 100 can be configured to support the accessories regardless of the position or presence of the cross bars 106. In other words, each side of the rack system 100 can support the accessories in the absence of a cross bar 106 or other lateral support extending between the two sides of the rack system 100 at or near the accessory (e.g., within the same one-third or one-half of the length of the lower and/or upper rail 122, 124). As a result, the cross bars 106 can be moved or removed without requiring removal of the accessories. In some configurations, the accessories do not protrude significantly into a central portion of the cargo space 58. For example, in some configurations, the accessories do not extend beyond or substantially beyond a wheel well of the truck bed 50. In other configurations, the accessories do not extend beyond or substantially beyond an innermost extent of the first side support 102 and/or the second side support 104. In some configurations, the accessories do not extend into a central one-half (center region flanked on each side by one-quarter width regions) of the truck bed 50 along a portion or an entirety of the length of the truck bed 50. In some configurations, the accessories do not extend into a central one-third of the truck bed 50 along a portion or an entirety of the length of the truck bed 50. Accordingly, with such an arrangement, objects can be placed within a central portion of the cargo space 58 of the truck bed 50 without requiring removal of the accessories.

The toolbox 130 can be mounted to the rack system 100 in any suitable manner. In some configurations, the toolbox 130 is mounted to both the lower rail 122 and the upper rail 124. In some such configurations, the toolbox 130 is mounted only to the lower rail 122 and the upper rail 124. In other words, no additional support structures, such as legs extending toward or to the floor 52, are required to support the toolbox 130. Such an arrangement preserves the cargo space 58 within the truck bed 50. In the illustrated arrangement, the toolbox 130 is supported in a cantilevered manner from each of the lower rail 122 and the upper rail 124. However, in alternative arrangements, the toolbox 130 could be supported in a cantilevered manner from only one of the lower rail 122 and the upper rail 124 and could be otherwise supported or not supported at all by the other of the lower rail 122 and the upper rails 124.

In some configurations, the toolbox 130 includes a lower bracket 160 that connects the toolbox 130 to the lower rail 122 and an upper bracket 162 that connects the toolbox 130 to the upper rail 124. Each bracket 160, 162 comprises an L-shaped portion having a first or long side 164 attached to the toolbox 130 and a second or short side 166 that is coupled to the appropriate one of the lower or upper rail 122, 124. The short sides 166 can be positioned at, adjacent to or near the laterally outer end of the toolbox 130. The outer end of the toolbox 130 can be angled relative to the inner end or can be oblique with respect to the upper and lower ends of the toolbox 130. Such an arrangement sandwiches the toolbox 130 between the long sides 164 of the lower and upper brackets 160, 162 to create a shear plate arrangement that provides exceptional strength to the mounting arrangement and avoids the needs for additional supports. The long sides 164 of the brackets 160, 162 can be secured to the toolbox 130 by any suitable arrangement, such as by one or more fasteners, for example. Alternatively, the brackets 160, 162 or portions thereof (e.g., short sides 166) can be integrated or unitarily-formed with the toolbox 130.

In some configurations, the gas can 132 or other accessories can be mounted in a similar manner to the toolbox 130. However, in the illustrated arrangement, the gas can 132 is mounted to the lower and upper rails 122, 124 by a single bracket 170 that extends between and is coupled to the lower and upper rails 122, 124. The bracket 170 can be generally rectangular in shape and can extend at an angle equivalent to the lateral offset of the lower and upper rails 122, 124 or at the same angle as the first side support 102 (e.g., the first post 108 or second post 110) and/or the second side support 104. End portions of the bracket 170 can be bent or angled relative to a central portion to align with outward-facing sides of the lower and upper rails 122, 124. The gas can 132 can be secured to the bracket 170 by any suitable arrangement, such as a twist-lock mechanism 172, for example, as is known in the art. In some configurations, the twist-lock mechanism 172 or other locking mechanism is located on a central portion of the bracket 170.

The rack system 100 and any of the individual components or sub-assemblies thereof can be constructed from any suitable material or combination of materials by any suitable process or processes. For example, steel, aluminum, other metals or composite materials can be used to form the main components of the system 100, such as any or all of the side supports 102, 104, rails 122, 124, cross bars 106 and brackets 160, 162, 170. The accessories can be customized to the rack system 100 or brackets can be configured to permit generic accessories to be coupled to the rack system 100.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "one" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A truck bed rack system, comprising:
    a first support configured to be located on a first side of a truck bed, a rearward portion of the first support comprising a first vertical support and a second vertical support, a forward portion of the first support comprising a third vertical support;
    a second support configured to be located on a second side of the truck bed, a rearward portion of the second support comprising a first vertical support and a second vertical support, a forward portion of the second support comprising a third vertical support;
    a fixed cross bar configured to extend across the truck bed between the forward portions of the first and second supports;
    an upper support rail and a lower support rail on each side of the rack system, wherein the upper support rail is located closer to a center of the truck bed than the lower support rail;
    wherein the first and second vertical supports of each of the first and second supports are configured to cooperate to allow the respective rearward portions of each of the first and second supports to be self-supporting such that the first support and the second support can support a load without a horizontal support extending across the truck bed between the rearward portions of the first and second supports;
    a storage container supported by the rack system, the storage container having a body that defines a storage compartment and an opening to the storage compartment, the storage container further comprising a lid that selectively closes the opening;
    wherein the body of the storage container is located between the upper support rail and the lower support rail and wherein the opening is located on an outer side of the body facing away from the center of the truck bed; and
    wherein an upper end of the outer side of the body is located closer to the center of the truck bed than a lower end of the outer side of the body.

2. The truck bed rack system of claim 1, further comprising an upper mounting flange that extends upwardly from the body of the storage container and is connected to the upper support rail.

3. The truck bed rack system of claim 2, further comprising a lower mounting flange that extends downwardly from the body of the storage container and is connected to the lower support rail.

4. The truck bed rack system of claim 2, wherein the upper mounting flange is located on an outward facing side of the upper support rail.

5. The truck bed rack system of claim 2, wherein an upper end of the lid is connected to the body of the storage container such that a lower end of the lid is lifted to expose the opening to the storage compartment.

6. The truck bed rack system of claim 5, further comprising a strut configured to hold the lid open.

7. The truck bed rack system of claim 1, wherein an inner side of the body of the storage container opposite the opening is vertically oriented in use, such that an upper end of the storage compartment defines a smaller depth than a lower end of the storage compartment.

8. A truck bed rack system, comprising:
    a first support configured to be located on a first side of a truck bed, a rearward portion of the first support comprising a first vertical support and a second vertical support, a forward portion of the first support comprising a third vertical support;
    a second support configured to be located on a second side of the truck bed, a rearward portion of the second support comprising a first vertical support and a second vertical support, a forward portion of the second support comprising a third vertical support;
    a fixed cross bar configured to extend across the truck bed between the forward portions of the first and second supports;

an upper support rail and a lower support rail on each side of the rack system, wherein the upper support rail is located closer to a center of the truck bed than the lower support rail;

wherein the first and second vertical supports of each of the first and second supports are configured to cooperate to allow the respective rearward portions of each of the first and second supports to be self-supporting such that the first support and the second support can support a load without a horizontal support extending across the truck bed between the rearward portions of the first and second supports;

a second cross bar extending between opposite sides of the truck bed, wherein a position of the second cross bar is adjustable relative to the rack system along a lengthwise direction of the truck bed.

9. A rack system for use in a truck bed, comprising:

a pair of first side supports located, in use, on opposing sides of the truck bed;

a pair of second side supports located, in use, on opposing sides of the truck bed at locations spaced away from the pair of first side supports along a length of the truck bed;

an upper longitudinal rail and a lower longitudinal rail positioned on one of the opposing sides of the truck bed and extending between the first side support and the second side support on the one side;

a container comprising:
  a body having an upper wall, a lower wall, an outer wall, an end wall, and a pair of spaced-apart side walls, the upper wall, the lower wall, the outer wall, the end wall and the pair of side walls cooperating to define an internal storage space having an opening opposite the end wall;
  an upper mount configured to support the container relative to the upper longitudinal rail;
  a lower mount configured to support the container relative to the lower longitudinal rail;

wherein the upper longitudinal rail of the rack system is located closer to a lengthwise centerline of the truck bed than the lower longitudinal rail;

wherein the opening of the body of the container is located further from the lengthwise centerline of the truck bed than the end wall with the opening positioned between the upper longitudinal rail and the lower longitudinal rail.

10. The rack system of claim 9, wherein the container defines a height in a direction between the upper wall and the lower wall and a depth in a direction between the end wall and the outer wall, wherein the upper mount and the lower mount are offset from one another along the depth of the container.

11. The rack system of claim 10, wherein the upper mount and the lower mount form the only support for the container relative to the rack system or the truck bed.

12. The rack system of claim 11, wherein the upper mount comprises an upper mounting flange and the lower mount comprises a lower mounting flange.

13. The rack system of claim 9, wherein the upper mount and the lower mount form the only support for the container relative to the rack system or the truck bed.

14. The rack system of claim 13, wherein the upper mount comprises an upper mounting flange and the lower mount comprises a lower mounting flange.

15. The rack system of claim 9, wherein an upper end of the outer wall of the body is located closer to the lengthwise centerline of the truck bed than a lower end of the outer wall of the body.

16. The rack system of claim 9, wherein the end wall of the container body is vertically oriented in use, such that an upper end of the storage space defines a smaller depth than a lower end of the storage space.

17. The rack system of claim 9, wherein the container is configured to be a water container.

18. The rack system of claim 9, wherein the container further comprises a lid that selectively closes the opening of the body.

19. The rack system of claim 9, wherein the outer wall includes a lid having an upper end connected to the body and a lower end configured to lifted to expose the opening.

* * * * *